(12) United States Patent
Rasheed et al.

(10) Patent No.: US 7,980,056 B2
(45) Date of Patent: Jul. 19, 2011

(54) METHODS AND APPARATUS FOR CONTROLLING AIR FLOW WITHIN A PULSE DETONATION ENGINE

(75) Inventors: Adam Rasheed, Glenville, NY (US); Anthony John Dean, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 1169 days.

(21) Appl. No.: 11/348,869

(22) Filed: Feb. 7, 2006

(65) Prior Publication Data

US 2007/0180833 A1 Aug. 9, 2007

(51) Int. Cl.
*F02C 7/04* (2006.01)

(52) U.S. Cl. .......................... 60/39.83; 60/776

(58) Field of Classification Search ............. 60/776, 60/39.83, 39.76, 39.77, 39.78, 247, 248, 60/249
See application file for complete search history.

(56) References Cited

U.S. PATENT DOCUMENTS

| | | | |
|---|---|---|---|
| 2,010,020 A * | 8/1935 | Holzwarth | 60/772 |
| 2,579,321 A * | 12/1951 | Guercken | 60/39.39 |
| 4,089,653 A | 5/1978 | Ward, III | |
| 4,101,294 A | 7/1978 | Kimura | |
| 4,115,514 A | 9/1978 | Ward, III | |
| 4,147,754 A | 4/1979 | Ward, III | |
| 4,150,953 A | 4/1979 | Woodmansee | |
| 4,324,776 A | 4/1982 | Kim | |
| 5,188,811 A | 2/1993 | Ayala | |
| 5,410,870 A * | 5/1995 | Brault et al. | 60/802 |
| 5,753,198 A | 5/1998 | Ayala et al. | |
| 6,062,018 A * | 5/2000 | Bussing | 60/39.39 |
| 6,494,153 B1 | 12/2002 | Lyon | |
| 6,667,022 B2 | 12/2003 | Cole | |
| 6,669,917 B2 | 12/2003 | Lyon | |
| 6,911,057 B2 | 6/2005 | Lyon | |
| 2007/0137172 A1 * | 6/2007 | Rasheed et al. | 60/39.76 |

* cited by examiner

*Primary Examiner* — Michael Cuff
*Assistant Examiner* — Vikansha S Dwivedi
(74) *Attorney, Agent, or Firm* — Richard A. DeCristofaro

(57) ABSTRACT

A flow control device for use with a pulse detonation chamber including an inlet coupled in flow communication with a source of compressed air. The inlet extends at least partially into the chamber to facilitate controlling air flow into the chamber. The device also includes a body portion extending downstream from and circumferentially around the inlet, wherein the body portion is positioned in flow communication with the inlet.

19 Claims, 3 Drawing Sheets

METHODS AND APPARATUS FOR CONTROLLING AIR FLOW WITHIN A PULSE DETONATION ENGINE

BACKGROUND OF THE INVENTION

This invention relates generally to pulse detonation engines, and more particularly, to methods and apparatus for controlling air flow within a pulse detonation engine.

Known pulse detonation engines generally operate with a detonation process having a pressure rise, as compared to engines operating within a constant pressure deflagration. As such, pulse detonation engines may have the potential to operate at higher thermodynamic efficiencies than may generally be achieved with deflagration-based engines.

At least some known hybrid pulse detonation-turbine engines have replaced the steady flow constant pressure combustor within the engine with a pulse detonation combustor that may include at least one pulse detonation chamber. Although such engines vary in their implementation, a common feature amongst hybrid pulse detonation-turbine engines is that air flow from a compressor is directed into the pulse detonation chamber wherein the air is mixed with fuel and ignited to produce a combustion pressure wave. The combustion wave transitions into a detonation wave followed by combustion gases that are used to drive the turbine. However, known unvalved combustors are not designed to restrict backward traveling shock waves generated from the detonation wave and/or the reverse flow that follows the backward traveling shock wave and as such forward flow is reduced. Furthermore, because of asymmetries in the actual machined hardware or slight differences in geometry due to manufacturing, an amount of air flow entering each chamber may be different. Because known combustors are not designed to balance air flow through each chamber, the different amounts of air flow may adversely affect the combustor performance.

To facilitate enhancing combustor operations, at least some known pulse detonation engines include common air inlet plenums to facilitate restricting backward flow and balancing air flow. However, the use of plenums may still result in enough reverse flow and flow-imbalance to adversely affect combustion performance.

BRIEF DESCRIPTION OF THE INVENTION

In one aspect, a flow control device for use with a pulse detonation chamber is provided. The device includes an inlet coupled in flow communication with a source of compressed air. The inlet extends at least partially into the chamber to facilitate controlling air flow into the chamber. The device also includes a body portion extending downstream from and circumferentially around the inlet, wherein the body portion is positioned in flow communication with the inlet.

In another aspect, a pulse detonation engine is provided. The engine includes a compressor configured to compress air therein and a pulse detonation combustor coupled to an axial turbine including at least one pulse detonation chamber comprising an inlet portion, an outlet portion, and a body portion extending therebetween. The inlet portion is coupled in flow communication with the compressor for receiving compressed air therethrough. The chamber includes a fuel injector for supplying fuel to the chamber and a detonation device coupled to the chamber for initiating a detonation wave within the chamber. The chamber also includes a flow control device that includes an inlet for controlling air flow into the at least one pulse detonation chamber and a body portion coupled in flow communication with the inlet.

In a further aspect, a method for adjusting air flow through a pulse detonation combustor is provided. The method includes providing at least one pulse detonation chamber including an inlet portion, an outlet portion, and a body portion extending therebetween. The method also includes coupling an inlet within the chamber inlet portion and in flow communication with a source of compressed air for controlling air flow into the at least one pulse detonation chamber and coupling a body portion downstream from and circumferentially around the chamber inlet portion and in flow communication with the inlet.

DETAILED DESCRIPTION OF THE INVENTION

Figure 1:
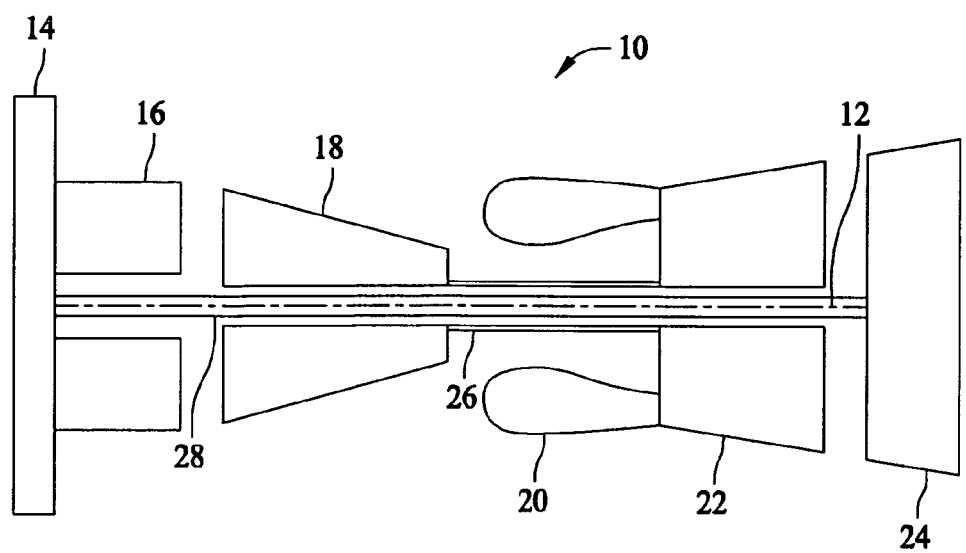
FIG. 1 is a schematic illustration of an exemplary hybrid pulse detonation-turbine engine.

FIG. 1 is a schematic illustration of an exemplary hybrid pulse detonation-turbine engine 10. Engine 10 includes, in serial axial flow communication and aligned about a longitudinal centerline axis 12, a fan 14, a booster 16, a high pressure compressor 18, and a pulse detonation combustor (PDC) 20, a high pressure turbine 22, and a low pressure turbine 24. High pressure turbine 22 is rotatably coupled to high pressure compressor 18 with a first rotor shaft 26, and low pressure turbine 24 is rotatably coupled to both booster 16 and fan 14 with a second rotor shaft 28, which is disposed within first shaft 26.

In operation, air flows through fan 14, booster 16, and high pressure compressor 18, and is pressurized by each component in succession. As used herein the term "air" should be understood to mean an oxidizer. For example, and without limitation, air can be oxygen and/or compressed air. In the exemplary embodiment, PDC 20 is configured to receive highly compressed air from compressor 18, such that in the exemplary embodiment, compressor 18 is the primary source of air flow for PDC 20. In alternative embodiments, a plenum (not shown) supplies air to PDC 20. In another alternative embodiment, two or more separate plenums (not shown) supply air to PDC 20. Air flow discharged from PDC 20 drives turbines 22 and/or 24 before exiting gas turbine engine 10. A portion of the air flowing through either of fan 14, booster 16, and high-pressure compressor 18 can be diverted to use as cooling air for hotter portions of the engine or associated support structures such as an airframe. A portion of the air passing through fan 14 particularly may be diverted around the other engine components and mixed with the downstream exhaust stream to enhance thrust and reduce noise.

As used herein, the term "pulse detonation combustor" ("PDC") is understood to mean any combustion device or system wherein a series of repeating detonations or quasi-detonations within the device generate a pressure rise and subsequent acceleration of combustion products as compared to pre-burned reactants. The term "quasi-detonation" is understood to mean any combustion process that produces a pressure rise and velocity increase that are higher than the pressure rise and velocity produced by a deflagration wave. Typical embodiments of PDC include a means of igniting a fuel/oxidizer mixture, for example a fuel/air mixture, and a confining chamber, in which pressure wave fronts initiated by the ignition process coalesce to produce a detonation wave. Each detonation or quasi-detonation may be initiated be either an external ignition, such as a spark discharge or a laser pulse, and/or by a gas dynamic process, such as shock focusing, auto-ignition or through detonation via cross-firing. The geometry of the detonation chamber is such that the pressure rise of the detonation wave expels combustion products from the PDC exhaust to produce a thrust force, or to generate work by imparting momentum to a moving component of the engine. As known to those skilled in the art, pulse detonation may be accomplished in a number of types of detonation chambers, including detonation tubes, shock tubes, resonating detonation cavities and annular detonation chambers. As used herein, the term "tube" includes pipes having circular or non-circular cross-sections with constant or non-constant cross sectional area. Exemplary tubes include cylindrical tubes, as well as tubes having polygonal cross-sections, for example hexagonal tubes.

Figure 2:
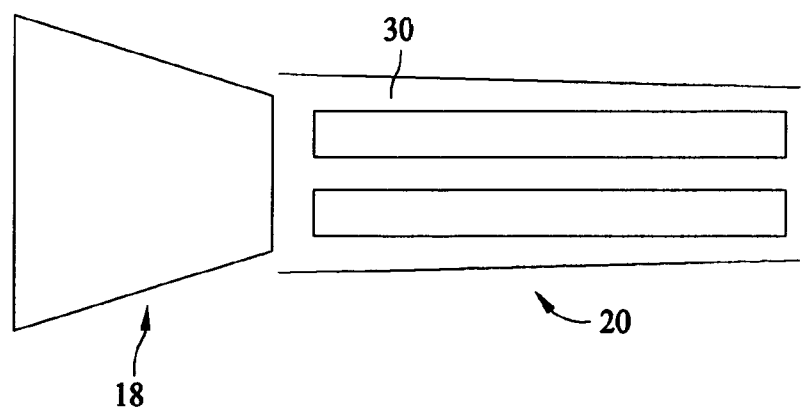
FIG. 2 is a schematic illustration of a portion of the hybrid pulse detonation-turbine engine shown in FIG. 1.

FIG. 2 is a schematic illustration of a portion of pulse detonation combustor 20. In the exemplary embodiment, pulse detonation combustor 20 includes a plurality of pulse detonation chambers 30 extending therethrough and arranged in an annular configuration. Each chamber 30 is configured to expel a respective pressure-rise combustion (or "detonation") product stream during a respective pulse detonation cycle downstream towards turbine 22 (shown in FIG. 1).

Figure 3:
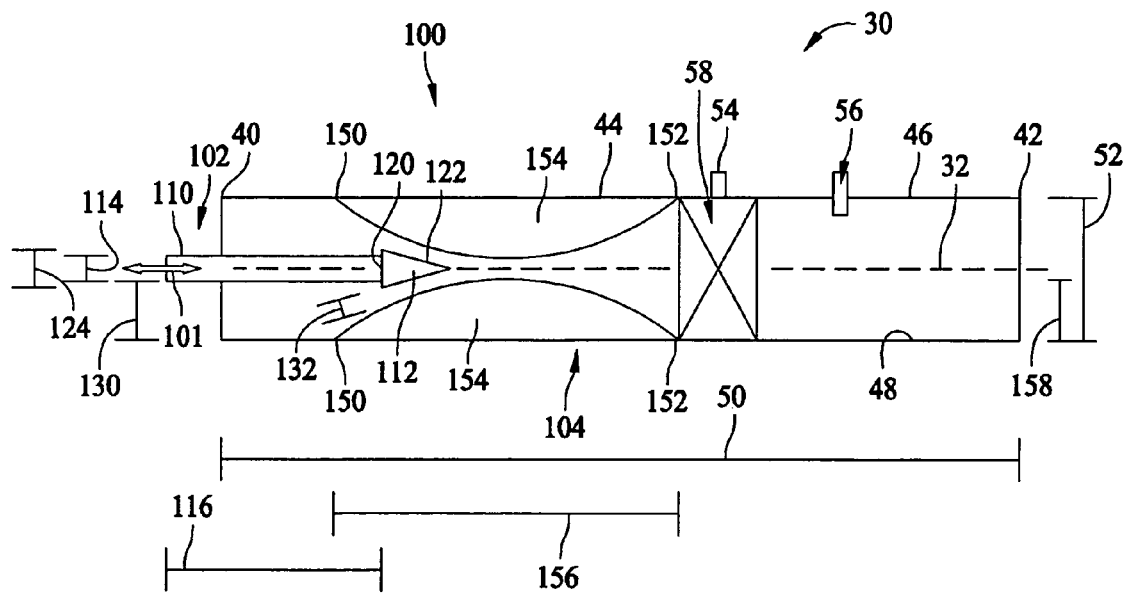
FIG. 3 is a cross-sectional view of an exemplary embodiment of a pulse detonation chamber shown in FIG. 2 and including an exemplary embodiment of flow control device.

FIG. 3 is a cross-sectional view of an exemplary embodiment of pulse detonation chamber 30 including an exemplary embodiment of a flow control device 100. Chamber 30 may be any one of, but not limited to being, a tube, a chamber, and a cavity. In the exemplary embodiment, chamber 30 is substantially cylindrical tube having a centerline axis 32 and including an inlet portion 40, an outlet portion 42, and a body portion 44 extending therebetween. In the exemplary embodiment, inlet portion 40 is substantially circular and is coupled downstream from, and in flow communication with compressor 18 (shown in FIGS. 1 and 2) such that substantially any compressed air discharged from compressor 18 is received within inlet 40.

Body portion 44 is defined by an outer surface 46 and an opposite inner surface 48. Chamber 30 is defined by a length 50 and a diameter 52. Length 50 and diameter 52 are variably selected depending on the particular application for pulse detonation chamber 30. For example, length 50 and diameter 52 may be selected based on the type of fuel used, or based on other constraints such as space and/or weight limitations. Chamber 30 may be fabricated from high temperature materials configured to withstand the high temperature associated with the operation of pulse detonation chamber 30 and associated products. For example, body portion 44 may be a single wall or a multi-wall structure and inner surface 48 may include coatings such as thermal barrier coatings, anti-oxidation coatings, or other coating typically used on hot gas path components.

Chamber 30 includes a fuel injector 54 and a detonation device 56 that are each coupled to chamber 30. In the exemplary embodiment, fuel injector 54 is configured to supply fuel to a fuel-air mixture chamber 58 and detonation device 56 is configured to initiate detonation waves. Detonation device 56 may be, for example, an igniter such as, but not limited to, a high energy spark plug, a torch igniter having separate fuel and oxidizer, and/or a plasma jet igniter, a laser, or a shock focus device.

In the exemplary embodiment, flow control device 100 includes an inlet 102 and a body portion 104. In the exemplary embodiment, flow control device 100 is movably coupled at least partially within chamber 30 and is aligned substantially parallel to axis 32, and as such, flow control device 100 moves bi-directionally as indicated by arrow 101. Flow control device 100 is configured to facilitate ensuring that each chamber 30 receives the proper amount of air necessary for a fuel-air mixture detonation to occur and preventing backward traveling shock waves and the reverse flow that follows the backward traveling shock waves. Furthermore, flow control device 100 is configured to adapt to variations in air flow path resistance, and/or variations in the fuel delivery system.

In the exemplary embodiment, inlet 102 includes a body portion 110 and a coupling portion 112. In one embodiment, inlet 102 is fabricated as a unitary, one-piece assembly. In another embodiment, inlet 102 is fabricated from a plurality of components coupled together. In the exemplary embodiment, body portion 110 is substantially cylindrical and has a diameter 114 and a length 116. In the exemplary embodiment, diameter 114 is substantially constant through body portion 110. In another embodiment, diameter 114 is non-uniform. In alternative embodiments, diameter 114 and length 116 are variably selected depending on a particular application for pulse detonation chamber 30. In alternative embodiments, body portion 102 is variably selected depending on a particular application for pulse detonation chamber 30.

In the exemplary embodiment, coupling portion 112 is a substantially conical and includes a base portion 120 and a tapered portion 122. Base portion 120 coupled to body 110 has a diameter 124. In one embodiment, diameter 124 may be larger than diameter 114. In another embodiment, diameter 124 may be approximately the same size as diameter 114. In the exemplary embodiment, from base portion 120, tapered portion 122 converges linearly towards body portion 104. In another embodiment, tapered portion 122 converges non-linearly towards body portion 104. In the exemplary embodiment, tapered portion 122 is sealably coupled to engage body portion 104.

In the exemplary embodiment, inlet 102 is substantially concentrically aligned with and is slidably coupled to, chamber 30 such that inlet 102 facilitates controlling air flow into chamber 30. Inlet 102 is circumferentially spaced such that circumferential gap 130 is defined between inlet 102 and chamber inner surface 48 from inlet 40. It will be appreciated that in the exemplary embodiment, circumferential gap 130 is substantially symmetrical between inlet 102 and chamber inner surface 48. An overall dimension of gap 130 is dependent on diameter 52 of inlet 40 and diameter 114.

In one embodiment, inlet 102 is adjustable within chamber 30 such that a circumferential gap 132 is defined between inlet 102 and body portion 104. An overall size of gap 132 is variable to facilitate controlling an amount of air flow into chamber. In another embodiment, inlet 102 is fixedly secured within chamber 30 such that a pre-determined gap 132 is defined extends between inlet 102 and body portion 104. In such an embodiment, air flow into chamber is set at a predetermined flow rate. In a further embodiment, inlet 102 is adjustable during engine 10 operation. In alternative embodiments, inlet 102 is only adjustable during non-operational periods of engine 10.

In the exemplary embodiment, body portion 104 includes an inlet portion 150, an outlet portion 152, and a body portion 154 extending therebetween. Body portion 104 extends circumferentially from chamber inner surface 48 between inlet 40 and fuel-air mixture chamber 58. Body portion 104 has a length 156 and a diameter 158. In the exemplary embodiment, length 156 is shorter than chamber length 50, and diameter 158 is smaller than diameter 52. In the exemplary embodiment, diameter 158 is adjustable and converges and/or diverges towards center axis 32 in a non-linear manner. In alternative embodiments, diameter 158 converges and/or diverges towards center axis 32 in a linear manner.

In the exemplary embodiment, body portion 154 has a substantially semi-circular cross-sectional profile that converges and diverges within at least a portion of chamber 30. In alternative embodiments, body portion 154 has any cross-sectional shape that enables body portion 154 to function as described herein. Specifically, inlet portion 150 and outlet portion 152 each have a diameter that is smaller than body portion 154, and as such, inlet portion 150 substantially converges from chamber inner surface 48 towards body portion 154. Moreover, in the exemplary embodiment, adjacent fuel-air mixture chamber 58, outlet portion 152 substantially diverges from body portion 154 towards chamber inner surface 48. Inlet portion 150 engages inlet tapered portion 122 and is configured to releasably, and/or sealably, engage tapered portion 122. More specifically, in the exemplary embodiment, inlet portion 150 has a shape that substantially mirrors or compliments a shape of tapered portion 122. In operation, for example, inlet tapered portion 122 is movable towards inlet portion 150 such that gap 132 is reduced, and as such, air flow around coupling portion 112 is reduced. Moreover, for example, inlet tapered portion 122 is movable away from inlet portion 150 such that gap 132 is increased, and as such, air flow around coupling portion 112 is increased. Alternatively, inlet tapered portion 122 is movable adjacent inlet portion 150 such that gap 132 is closed, and as such, air flow around coupling portion 112 is stopped.

Figure 4:
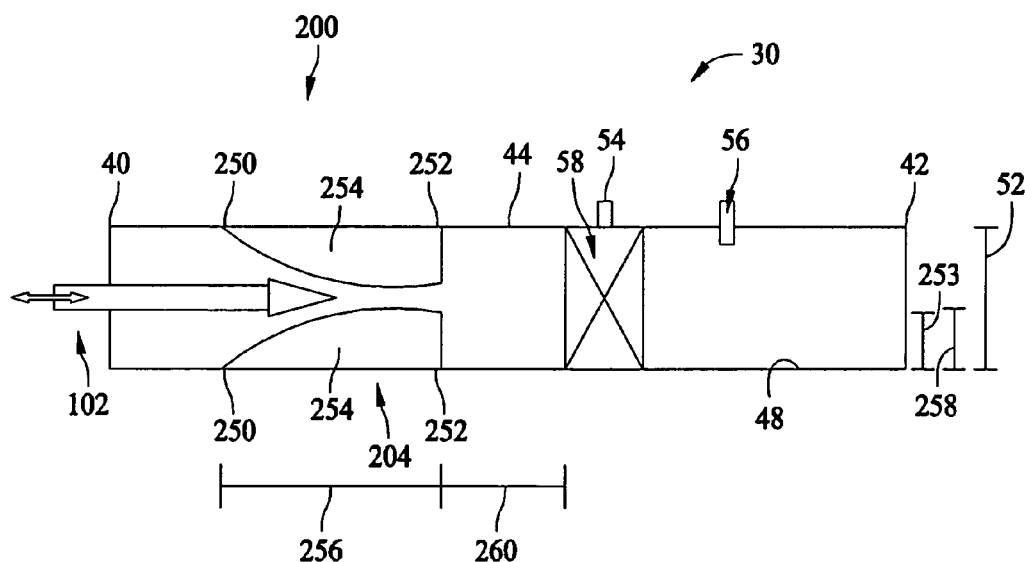
FIG. 4 is a cross-sectional view of an alternative embodiment of the flow control device shown in FIG. 3.

FIG. 4 is a cross-sectional view of an alternative embodiment of a flow control device 200. Flow control device 200 is configured to facilitate ensuring that each chamber 30 receives the proper amount of air necessary for a fuel-air mixture detonation to occur and preventing backward traveling shock waves and the reverse flow that follows the backward traveling shock waves. Furthermore, flow control device 200 is configured to adapt to variations in air flow path resistance, and/or variations in the fuel delivery system. Flow control device 200 includes inlet 102 and a body portion 204. Inlet 102 functions as described above.

In the exemplary embodiment, body portion 204 includes an inlet portion 250, an outlet portion 252, and a body portion 254 extending therebetween. Body portion 204 extends circumferentially from chamber inner surface 48 between inlet 40 and fuel-air mixture chamber 58. Body portion 204 is defined by a length 256 and a diameter 258. In the exemplary embodiment, length 256 is shorter than chamber length 50 (shown in FIG. 3), and diameter 258 is smaller than diameter 52. In the exemplary embodiment, diameter 258 is variable and converges and/or diverges towards center axis 32 (shown in FIG. 3) in a non-linear manner. In alternative embodiments, varying diameter 258 converges and/or diverges towards center axis 32 in a linear manner.

In the exemplary embodiment, body portion 204 has a substantially semi-circular cross-sectional profile that converges and partially diverges within at least a portion of chamber 30. In alternative embodiments, body portion 204 has any cross-sectional shape that enables body portion 204 to function as described herein. Specifically, inlet portion 250 has a diameter that is smaller than body portion diameter 258, and as such, inlet portion 250 substantially converges from chamber inner surface 48 towards body portion 254. Moreover, in the exemplary embodiment, outlet portion 252 has a diameter 253 that is smaller than body portion diameter 258, and as such, outlet portion 252 partially diverges from body portion 254 towards chamber inner surface 48 such that a distance 260 extends between outlet portion 252 and adjacent fuel-air mixture chamber 58. Inlet portion 250 engages inlet tapered portion 122 and is configured to releasably, and/or sealably, engage tapered portion 122. Inlet portion 250 has a shape that substantially mirrors or compliments a shape of tapered portion 122.

Figure 5:
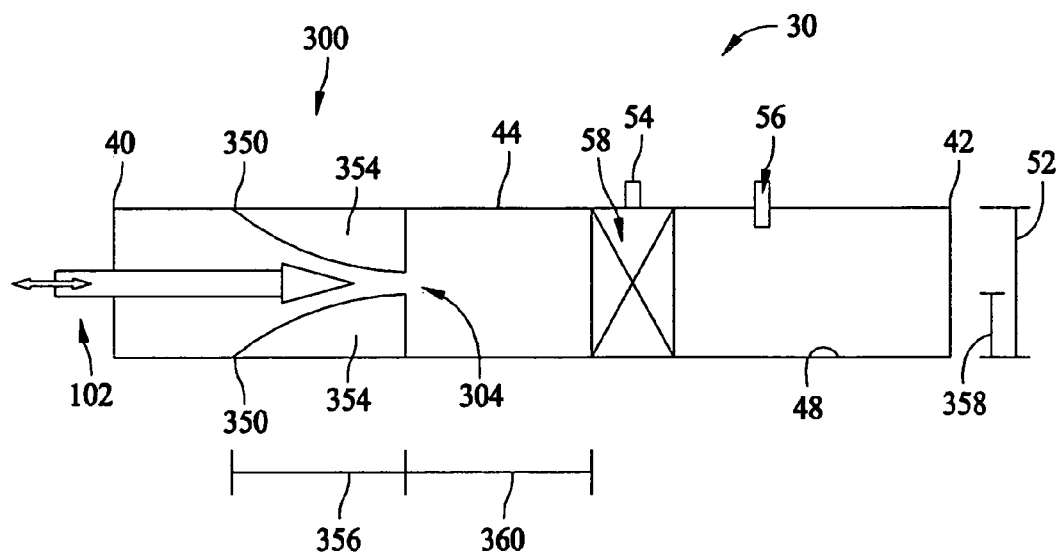
FIG. 5 is a cross-sectional view of a further alternative embodiment of the flow control device shown in FIG. 3.

FIG. 5 is a cross-sectional view of a further alternative embodiment of a flow control device 300. Flow control device 300 is configured to facilitate ensuring that each chamber 30 receives the proper amount of air necessary for a fuel-air mixture detonation to occur and preventing backward traveling shock waves and the reverse flow that follows the backward traveling shock waves. Furthermore, flow control device 300 is configured to adapt to variations in air flow path resistance, and/or variations in the fuel delivery system. Flow control device 300 includes inlet 102 and a body portion 304. Inlet 102 functions as described above.

In the exemplary embodiment, body portion 304 includes an inlet portion 350 and a body portion 354. Body portion 354 extends circumferentially from chamber inner surface 48 between inlet 40 and fuel-air mixture chamber 58. Body portion 304 has a length 356 and a diameter 358. In the exemplary embodiment, length 356 is smaller than chamber length 50 (shown in FIG. 3), and diameter 358 is smaller than diameter 52. In the exemplary embodiment, diameter 358 is variable and from inlet portion 350 converges towards center axis 32 (shown in FIG. 3) in a non-linear manner. In alternative embodiments, diameter 358 converges towards center axis 32 in a linear manner.

In the exemplary embodiment, body portion 304 has a substantially semi-circular cross-sectional profile that converges within at least a portion of chamber 30 and as such body portion 354 facilitates minimizing upstream propagation of shock waves. In alternative embodiments, body portion 304 has any cross-sectional shape that permits body portion 354 to function as described herein. Specifically, inlet portion 350 has a diameter that is smaller than body portion 354, and as such, inlet portion 350 substantially converges from chamber inner surface 48 towards body portion 354 such that a distance 360 extends between body portion 354 and fuel-air mixture chamber 58. Inlet portion 350 is configured to releasably, and/or sealably, engage tapered portion 122. More specifically, in the exemplary embodiment, inlet portion 350 has a shape that substantially mirrors or compliments a shape of tapered portion 122.

Figure 6:
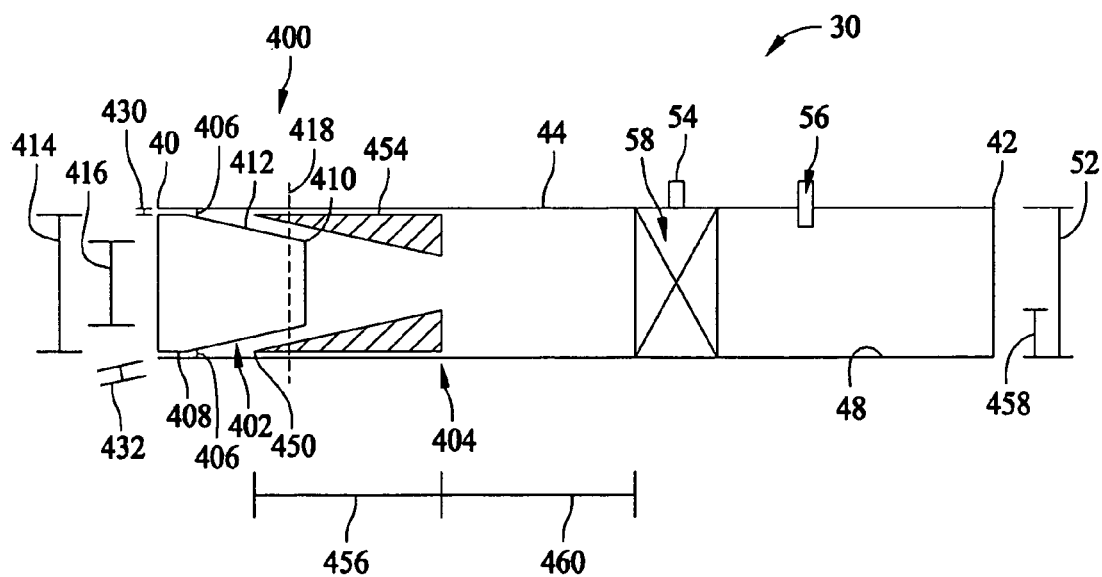
FIG. 6 is a cross-sectional view of yet another alternative embodiment of the flow control device shown in FIG. 3.

FIG. 6 is a cross-sectional view of yet another alternative embodiment of a flow control device 400. Flow device 400 is configured to ensure that each chamber 30 receives the proper amount of air necessary for a fuel-air mixture detonation to occur and preventing backward traveling shock waves and the reverse flow that follows the backward traveling shock waves. Furthermore, flow control device 400 is configured to adapt to variations in air flow path resistance, and/or variations in the fuel delivery system. In the exemplary embodiment, flow control device 400 includes a converging nozzle 402 and a body inlet portion 404.

In the exemplary embodiment, flow control device 400 is coupled at least partially within chamber 30 and is aligned substantially parallel to axis 32 (shown in FIG. 3). In the exemplary embodiment, flow control device 400 is circumferentially secured to inner surface 48 with a threaded fastener assembly 406. Nozzle 402 includes an inlet portion 408, an outlet portion 410, and a body portion 412 extending therebetween. In one embodiment, nozzle 402 is fabricated as a unitary, one-piece assembly. In another embodiment, nozzle 402 is fabricated from a plurality of components coupled together.

In the exemplary embodiment, inlet portion 408 is substantially cylindrical and has a diameter 414. In the exemplary embodiment, diameter 414 is substantially constant throughout inlet portion 408 and is smaller than chamber diameter 52. In another embodiment, diameter 414 is non-uniform. In alternative embodiments, diameter 414 is selected depending on a particular application for pulse detonation chamber 30. In alternative embodiments, inlet portion 408 is selected depending on a particular application for pulse detonation chamber 30.

In the exemplary embodiment, outlet portion 410 has a diameter 416. In the exemplary embodiment, diameter 416 is substantially constant and is smaller than chamber diameter 52. In another embodiment, diameter 416 is non-uniform. In alternative embodiments, diameter 416 is variably selected depending on a particular application for pulse detonation chamber 30. In alternative embodiments, outlet portion 410 is variably selected depending on a particular application for pulse detonation chamber 30. In the exemplary embodiment, outlet diameter 416 may be increased by removing and/or cutting a portion of outlet portion 410 at a cut line 418 thereby facilitating an increase in air flow. In one embodiment, outlet diameter 416 may be increased by adjusting the size of outlet portion 410 without removing a portion thereof.

In the exemplary embodiment, body portion 412 is a substantially conical and from inlet portion 408 converges linearly towards outlet portion 410 such that inlet diameter 414 is larger than outlet diameter 416. In another embodiment, body portion 412 converges non-linearly towards outlet portion 410. In the exemplary embodiment, outlet portion 410 is sealably coupled to engage body inlet portion 404.

In the exemplary embodiment, nozzle 402 is substantially concentrically aligned with chamber 30 such that nozzle 402 facilitates controlling air flow into chamber 30. Nozzle 402 is circumferentially spaced such that a circumferential gap 430 is defined between nozzle 402 and chamber inner surface 48 from inlet 40. It will be appreciated that in the exemplary embodiment, circumferential gap 430 is substantially symmetrical between nozzle 402 and chamber inner surface 48. An overall size of gap 430 is dependent on diameter 52 of inlet 40 and diameter 414.

In one embodiment, body inlet portion 404 is adjustable within chamber 30 such that a circumferential gap 432 is defined between inlet nozzle 402 and body inlet portion 404. An overall size of gap 432 is variable to facilitate controlling an amount of air flow into chamber. In another embodiment, body inlet portion 404 is fixedly secured within chamber 30 such that a pre-determined gap 432 is defined between nozzle 402 and body inlet portion 404. In such an embodiment, air flow into chamber is set at a pre-determined flow rate. In a further embodiment, body inlet portion 404 is adjustable during operation of engine 10. In alternative embodiments, body inlet portion 404 is only adjustable during non-operational periods of engine 10.

In the exemplary embodiment, body inlet portion 404 includes an inlet portion 450 and a body portion 454. Body inlet portion 404 extends circumferentially from chamber inner surface 48 between inlet 40 and fuel-air mixture chamber 58. Body inlet portion 404 has a length 456 and a diameter 458 and converges towards center axis 32 (shown in FIG. 3) in a linear manner. In alternative embodiments, body inlet portion 404 converges towards center axis 32 in a non-linear manner. In the exemplary embodiment, length 456 is shorter than chamber length 50 (shown in FIG. 3), and diameter 458 is smaller than diameter 52. In another embodiment, diameter 458 is adjustable and converges towards center axis 32 (shown in FIG. 3) in a linear manner.

In the exemplary embodiment, body inlet portion 404 has a substantially triangular cross-sectional profile that converges within at least a portion of chamber 30 and as such body inlet portion 404 facilitates minimizing upstream propagation of shock waves. In alternative embodiments, body inlet portion 404 has any cross-sectional shape that permits body inlet portion 404 to function as described herein. Specifically, inlet portion 450 has a diameter that is smaller than body portion 454, and as such, inlet portion 450 substantially converges from chamber inner surface 48 towards body portion 454 such that a distance 460 extends between body portion 454 and fuel-air mixture chamber 58. Body portion 454 is configured to releasably, and/or sealably, engage nozzle body portion 412. More specifically, in the exemplary embodiment, body portion 454 has a shape that substantially mirrors or compliments a shape of tapered portion nozzle body portion 412.

The above-described fuel control devices are efficient, cost effective, and highly reliable. The fuel control devices include an inlet portion and a body portion to facilitate controlling air flow into a pulse detonation chamber in a pulse detonation engine thereby improving engine dynamics. The use of fuel control devices ensure that each chamber has the proper fuel-air mixture for detonations to occur. Furthermore, the flow control device is configured to adapt to variations in air flow path resistance, and/or variations the fuel delivery system. As a result, the flow control device facilitates improving efficiency in a cost effective and reliable manner.

Exemplary embodiments of flow control devices with an inlet portion and a body portion are described above in detail. The flow control devices are not limited to the specific embodiments described herein, but rather, components of the flow control devices may be utilized independently and separately from other components described herein. Each flow control device component can also be used in combination with other flow control device components.

While the invention has been described in terms of various specific embodiments, those skilled in the art will recognize that the invention can be practiced with modification within the spirit and scope of the claims.

What is claimed is:

1. A flow control device for use with a pulse detonation chamber, said device comprising:
    an inlet coupled in flow communication with a source of compressed air, said inlet having a diameter less than a diameter of the chamber and defining a circumferential gap therebetween, said inlet extending at least partially into the chamber to facilitate controlling air flow into the chamber; and
    a body portion extending downstream from and circumferentially around said inlet, said body portion extending circumferentially and converging from an inner surface of said pulse detonation chamber and in flow communication with said inlet;
    wherein said inlet is coupled within the chamber such that a circumferential gap is defined between an outermost surface of said inlet and an inner surface of said body portion for controlling air flow into the chamber.

2. A device in accordance with claim 1 wherein said inlet portion comprises a converging nozzle coupled to a chamber inlet portion, said nozzle includes an outlet formed for fixedly controlling air flow into the chamber.

3. A device in accordance with claim 1 wherein said inlet is variably adjustable within the chamber to facilitate changing the circumferential gap defined between said inlet and said body portion.

4. A device in accordance with claim 1 wherein said body portion comprises a substantially convergent diameter for at least a portion thereof.

5. A device in accordance with claim 1 wherein said body portion comprises a first portion comprising a substantially convergent diameter and a second portion comprising a substantially divergent diameter.

6. A device in accordance with claim 1 wherein said body portion comprises a first portion comprising a substantially convergent diameter and a second portion comprising a partially divergent diameter.

7. A pulse detonation engine comprising:
a compressor configured to compress air therein;
a pulse detonation combustor coupled to an axial turbine including at least one pulse detonation chamber comprising an inlet portion, an outlet portion, and a combustor body portion extending therebetween, said inlet portion coupled in flow communication with said compressor for receiving compressed air therethrough, said chamber comprising:
a fuel injector for supplying fuel to said chamber;
a detonation device coupled to said chamber for initiating a detonation wave within said chamber; and
a flow control device comprising:
an inlet for controlling air flow into said at least one pulse detonation chambers, said inlet having a diameter less than a diameter of the chamber and defining a circumferential gap therebetween, said inlet extending at least partially into the chamber to facilitate controlling air flow into the chamber; and
a flow control device body portion extending downstream from and circumferentially around said inlet and coupled in flow communication with said inlet, said flow control device body portion extending circumferentially and converging from an inner surface of said pulse detonation chamber,
wherein said inlet is coupled within the chamber such that a circumferential gap is defined between an outermost surface of said inlet and an inner surface of said body portion for controlling air flow into the chamber.

8. An engine in accordance with claim 7 wherein said air inlet portion is fixedly secured within said chamber such that said circumferential gap defined between said inlet and said body portion is a pre-determined gap and facilitates controlling air flow into said chamber.

9. An engine in accordance with claim 8 wherein said inlet comprises a converging nozzle coupled to said chamber inlet portion and comprising a port formed for fixedly controlling air flow into said chamber.

10. An engine in accordance with claim 7 wherein said inlet portion is adjustably coupled within said chamber such that said circumferential gap defined between said inlet and said body portion is variable to facilitate selectively controlling air flow into said chamber.

11. An engine in accordance with claim 7 wherein said flow control device body portion comprises a substantially convergent diameter for at least a portion thereof.

12. An engine in accordance with claim 7 wherein said flow control device body portion comprises a first portion comprising a substantially convergent diameter and a second portion comprising a substantially divergent diameter.

13. An engine in accordance with claim 7 wherein said body portion comprises a first portion comprising a substantially convergent diameter and a second portion comprising a partially divergent diameter.

14. A method for adjusting air flow through a pulse detonation combustor, said method comprising:
providing at least one pulse detonation chamber including an inlet portion, an outlet portion, and a body portion extending therebetween;
providing a flow control device including a flow control device inlet and a flow control device body portion coupled in flow communication with said flow control device inlet, the flow control device inlet having a diameter less than a diameter of the pulse detonation chamber, said flow control device body portion extending circumferentially and converging from an inner surface of said pulse detonation chamber;
coupling the flow control device inlet within the chamber inlet portion and in flow communication with a source of compressed air such that a circumferential gap is defined between an outermost surface of the flow control device inlet and an inner surface of the pulse detonation chamber for controlling air flow into the at least one pulse detonation chamber; and
coupling the flow control device body portion downstream from and circumferentially around the chamber inlet portion and in flow communication with the flow control device inlet such that a circumferential gap is defined between an outermost surface of the flow control device inlet and an inner surface of the flow control device body portion.

15. A method in accordance with claim 14 wherein coupling the flow control device inlet within the chamber inlet portion further comprises coupling the flow control device inlet within the chamber such that the circumferential gap defined between the flow control device inlet and the flow control device body portion is pre-determined to facilitate controlling air flow into the chamber.

16. A method in accordance with claim 14 wherein coupling the flow control device inlet within the chamber inlet portion further comprises variably coupling the flow control device inlet within the chamber to facilitate changing the circumferential gap defined between the flow control device inlet and the flow control device body portion.

17. A method in accordance with claim 14 wherein coupling the flow control device body portion downstream from and circumferentially around the chamber inlet portion further comprises coupling the flow control device body portion comprising a substantially convergent diameter for at least a portion thereof.

18. A method in accordance with claim 14 wherein coupling the flow control device body portion downstream from and circumferentially around the chamber inlet portion further comprises coupling the flow control device body portion comprising a first portion comprising a substantially convergent diameter and a second portion comprising a substantially divergent diameter.

19. A method in accordance with claim 14 wherein coupling a body portion downstream from and circumferentially around the chamber inlet portion further comprises coupling the body portion comprising a first portion comprising a substantially convergent diameter and a second portion comprising a partially divergent diameter.

* * * * *